R. C. CAUGHEY.
BALING PRESS.
APPLICATION FILED APR. 3, 1909.
949,259.
Patented Feb. 15, 1910.
7 SHEETS—SHEET 1.
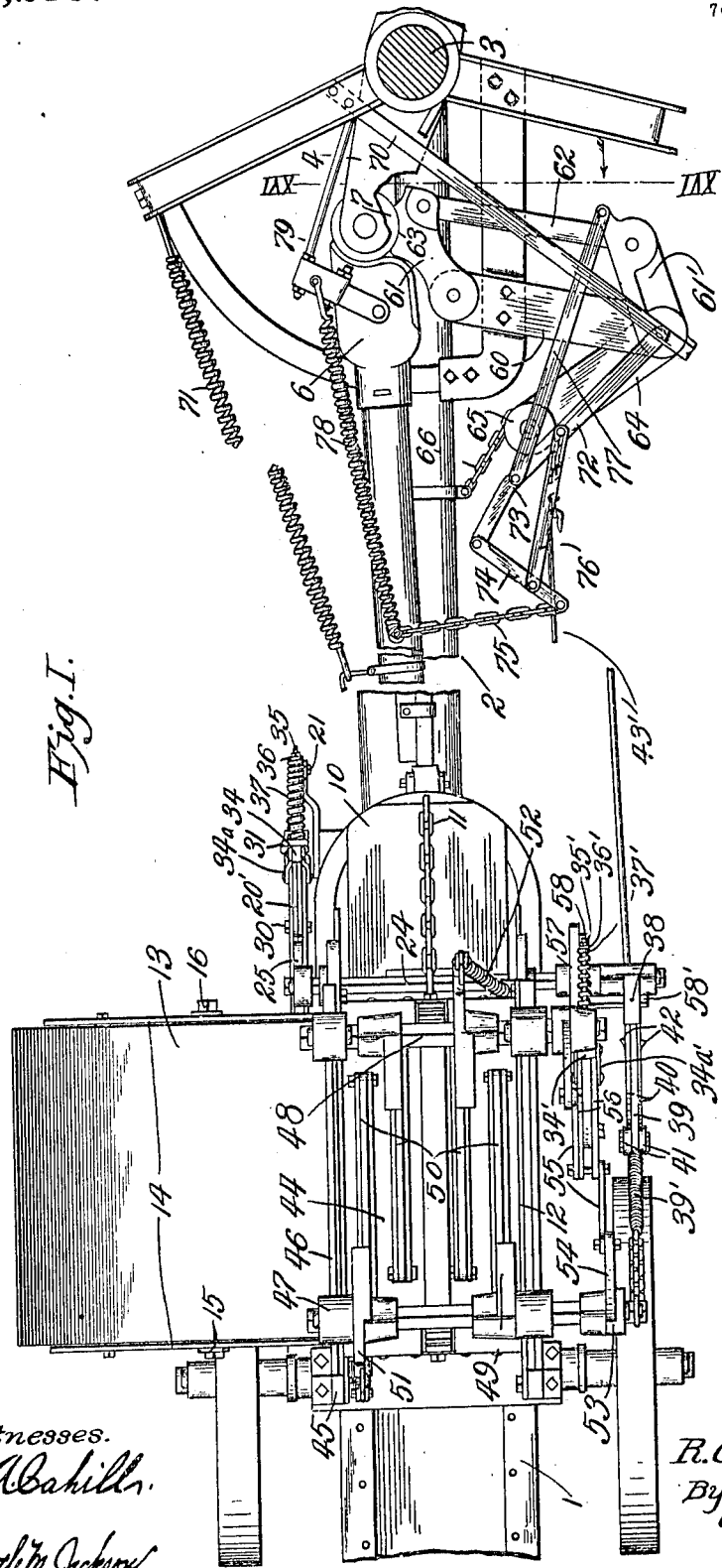
Fig. I.
Witnesses.
E. A. Cahill.
Myrtle M. Jackson.
Inventor.
R. C. Caughey.
By Arthur C. Brown
Attorney.

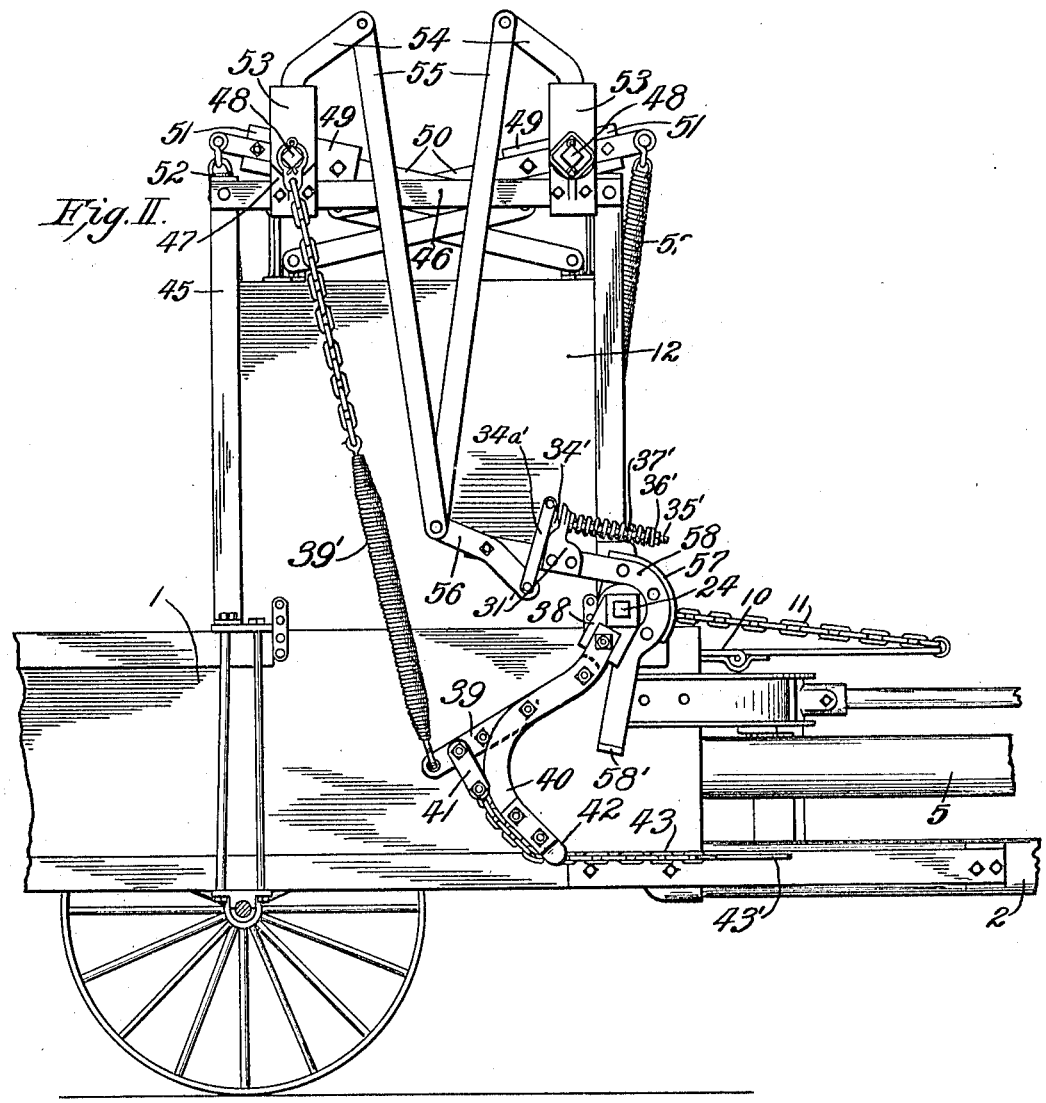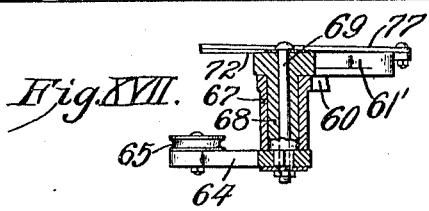

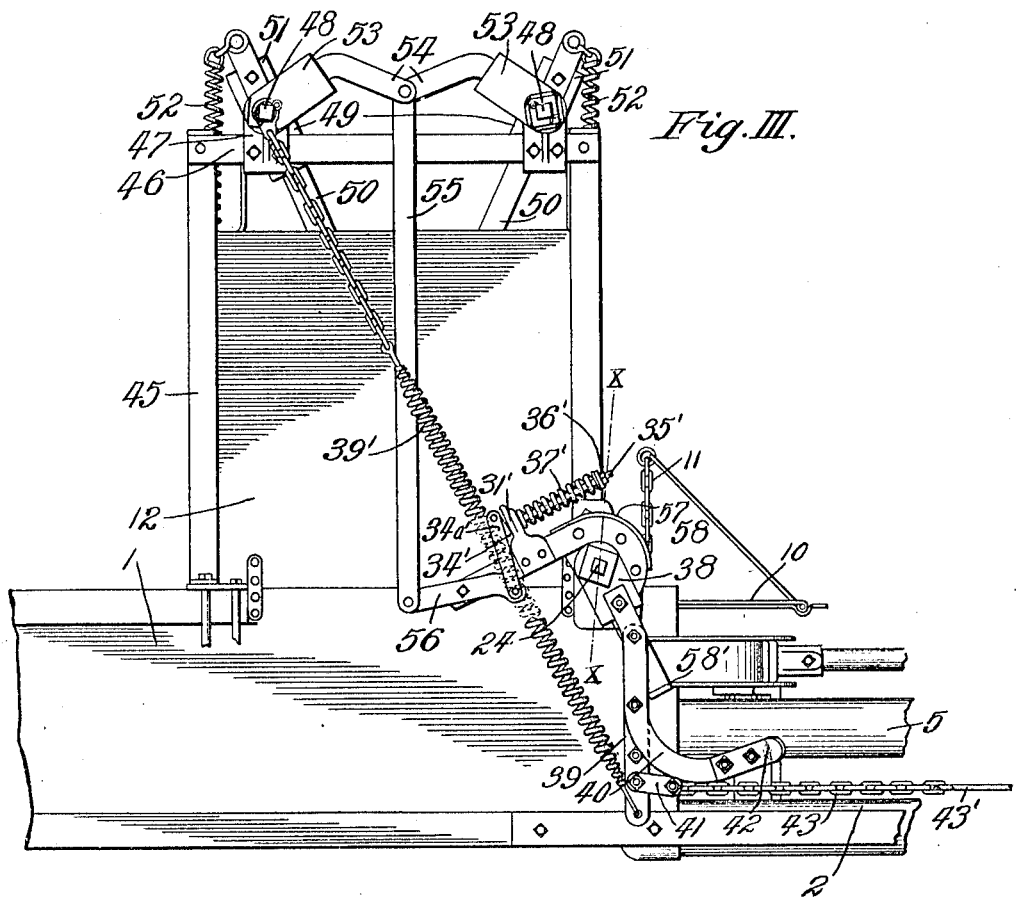
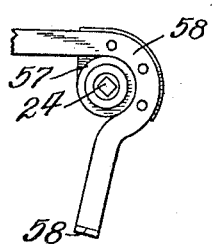
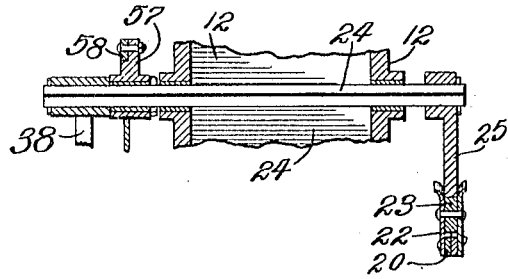

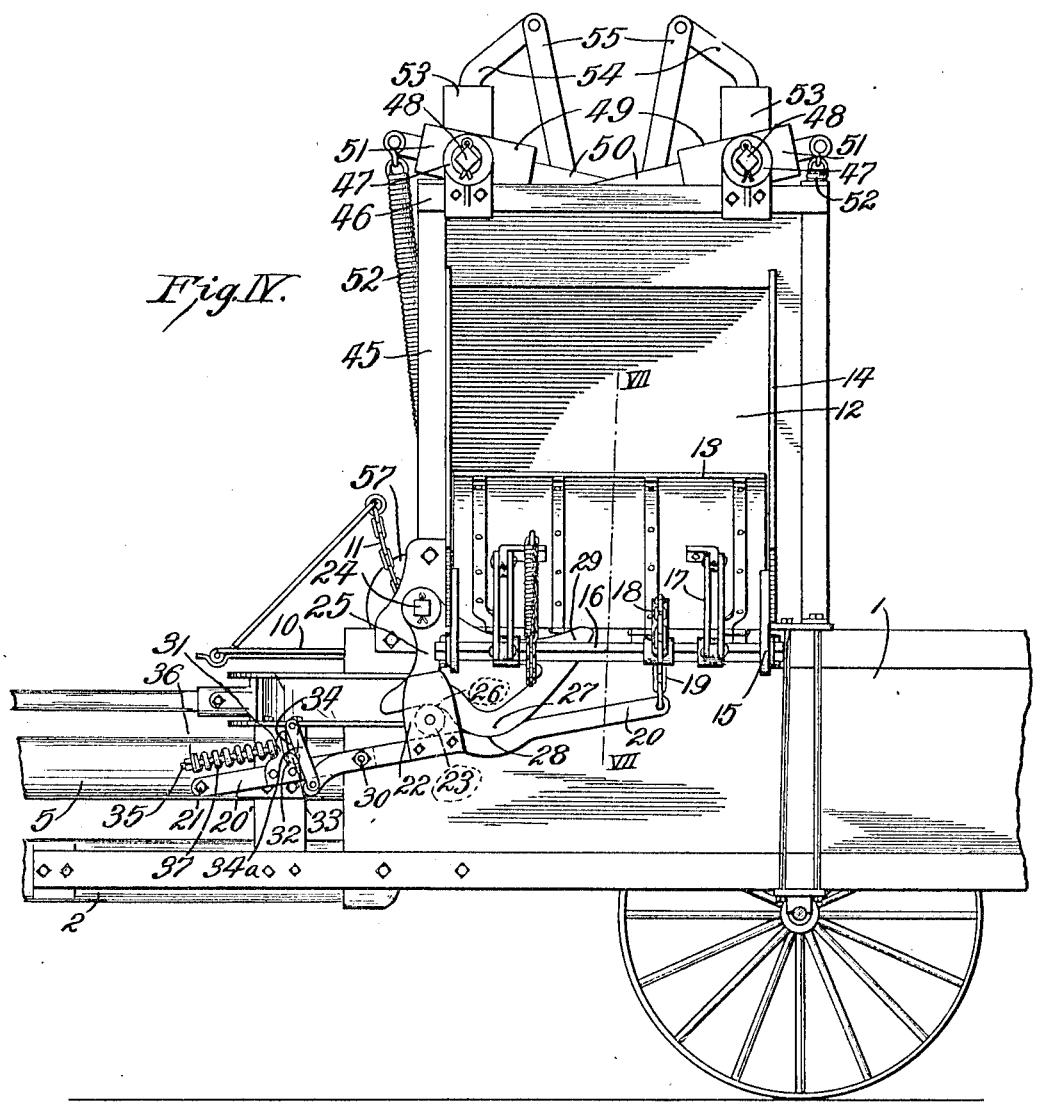

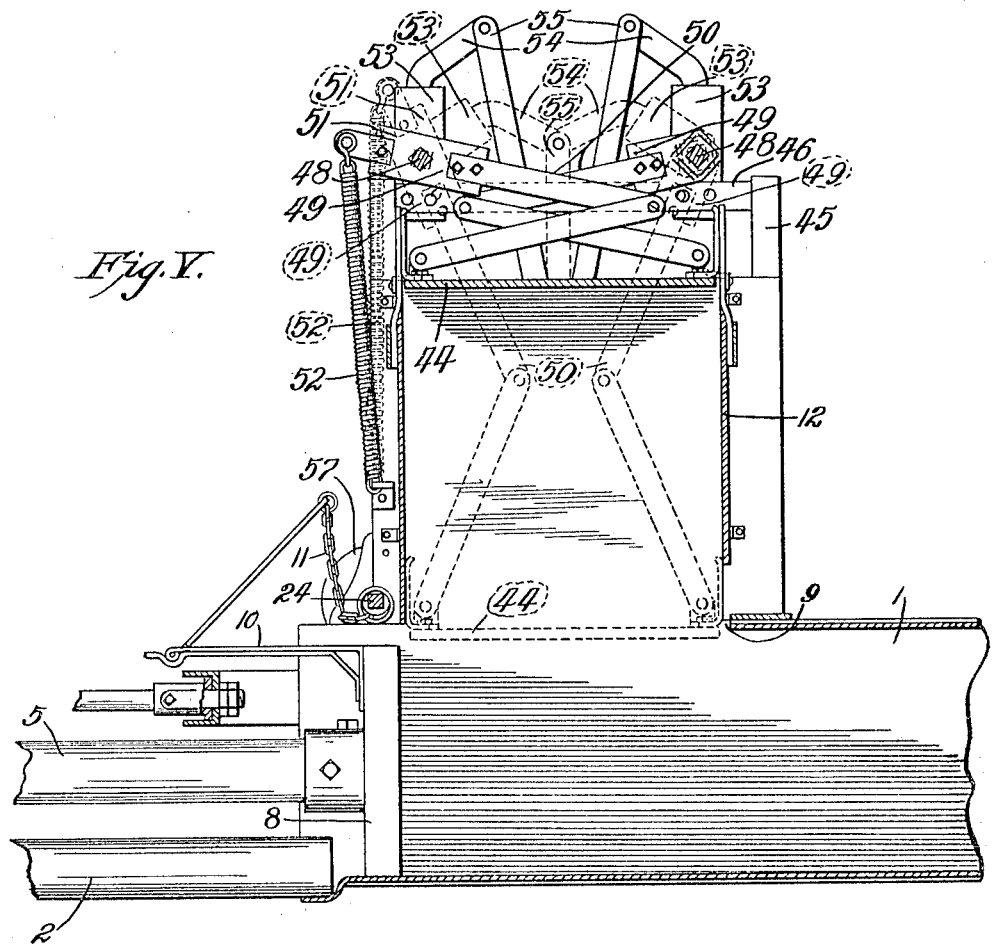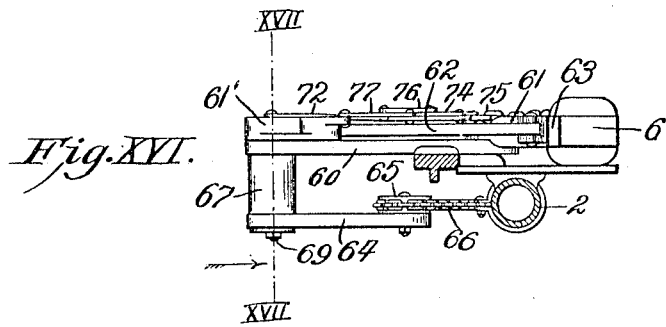

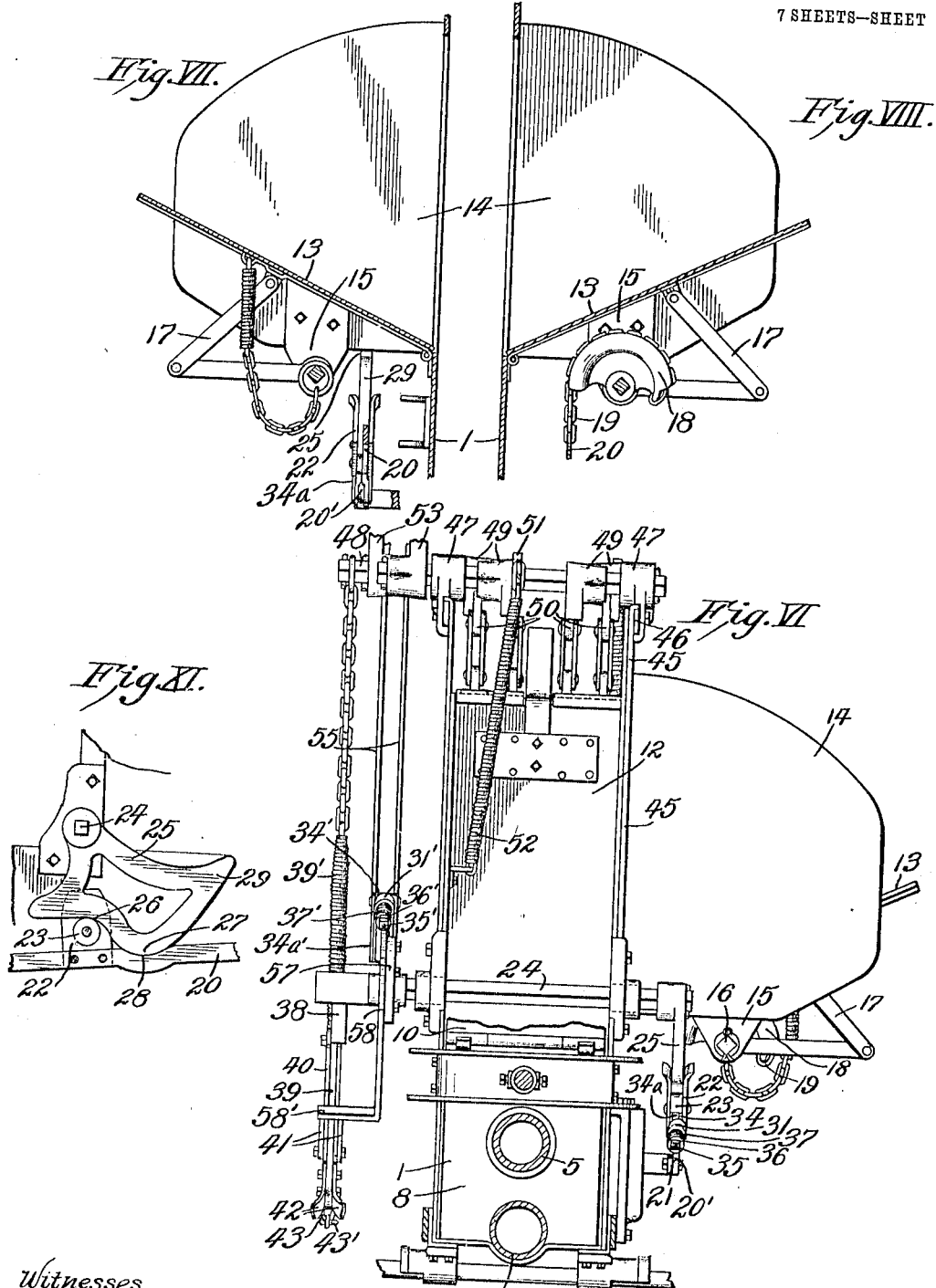

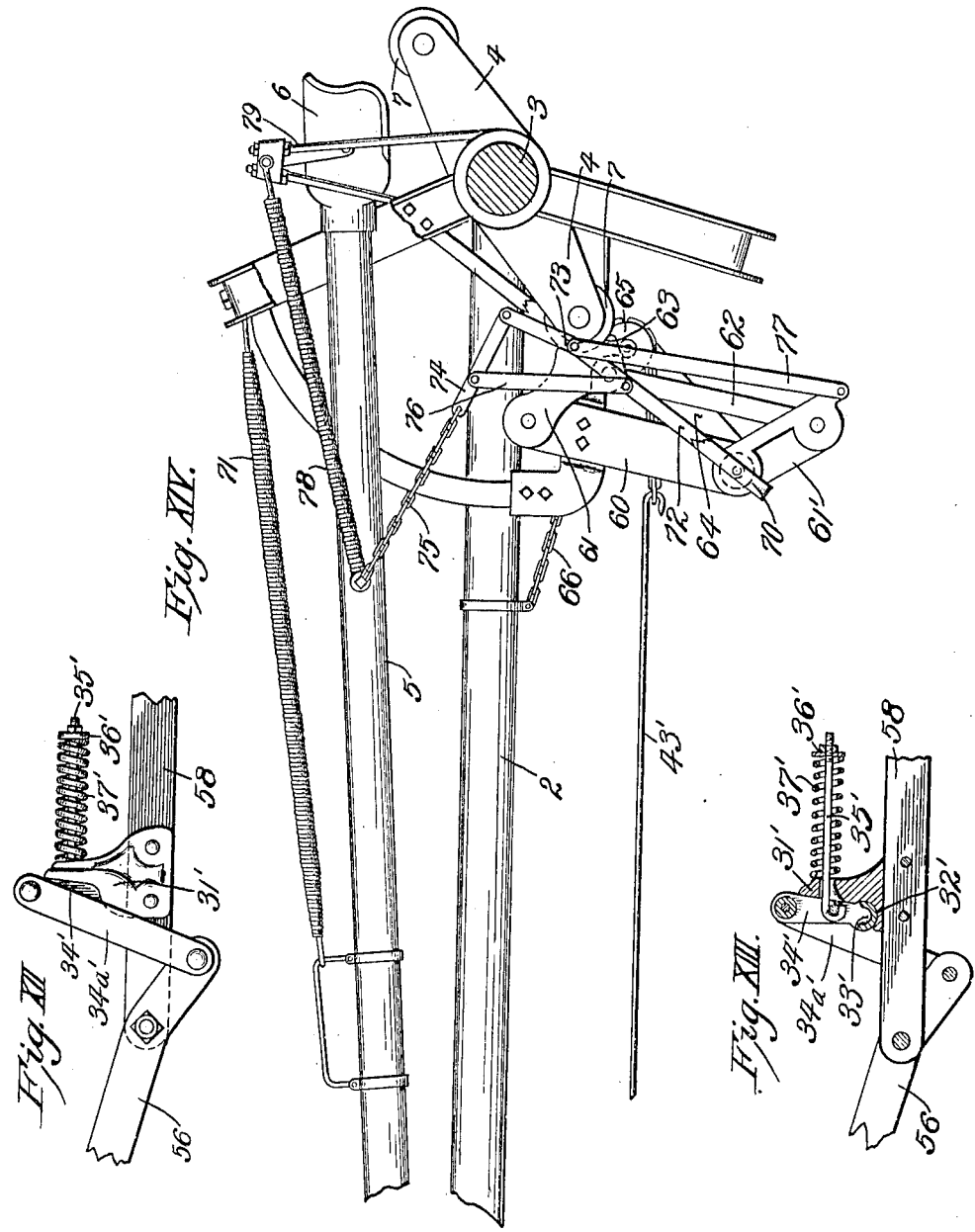

UNITED STATES PATENT OFFICE.

ROBERT C. CAUGHEY, OF KANSAS CITY, MISSOURI, ASSIGNOR TO EAGLE MANUFACTURING COMPANY, OF KANSAS CITY, MISSOURI, A CORPORATION OF MISSOURI.

BALING-PRESS.

949,259. Specification of Letters Patent. Patented Feb. 15, 1910.

Application filed April 3, 1909. Serial No. 487,821.

*To all whom it may concern:*

Be it known that I, ROBERT C. CAUGHEY, a citizen of the United States, residing at Kansas City, in the county of Jackson and State of Missouri, have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to improvements in hay presses and more particularly to a mechanism for automatically feeding hay to the baling case, during the baling operation of the press.
It is the object of my invention to provide a mechanism of this character which is simple in construction and operation and which may be applied to hay presses of ordinary construction.
In accomplishing this object I have provided the improved details of structure hereinafter described and pointed out in the claims, reference being had to the accompanying drawings, in which like reference numerals refer to like parts throughout the several views and in which:—

Figure I is a plan view of a hay press equipped with a feeding mechanism constructed according to my invention, the power mechanism being shown in the position it occupies when the feeding plunger is at the upper limit of its stroke. Fig. II is an enlarged view of the mechanism for actuating the feeding plunger, as it appears when the plunger is in its elevated position. Fig. III is a similar view of the same parts, with the plunger in its lowered position. Fig. IV is an enlarged view, in side elevation, of the hopper side and means for actuating the same. Fig. V is a longitudinal sectional view of the baling and feed cases, showing the feeding plunger and actuating parts from the side opposite that illustrated in Figs. II and III. Fig. VI is an end view of the baling and feeding cases and the actuating parts. Fig. VII is a sectional view of the hopper side on the line VII—VII, Fig. IV, looking toward the front of the press. Fig. VIII is a view on the same line, looking toward the rear of the press. Fig. IX is an enlarged detail view of the lever through which the feeding plunger and feed case closing parts are actuated. Fig. X is a sectional view of same on the line X—X, Fig. III. Fig. XI is an enlarged side view of the cam for closing the hopper side. Fig. XII is an enlarged side view of one of the spring trips. Fig. XIII is a longitudinal sectional view of same. Fig. XIV is a plan view of the power mechanism as it appears when the feeding plunger is at the lower limit of its stroke. Fig. XV is a side view of a portion of the bed plate and pitman, showing the application of the feeder power thereto. Fig. XVI is an end view of same on the line XVI—XVI, Fig. I. Fig. XVII is a sectional view of the power hub on the line XVII—XVII, Fig. XVI.

Referring more in detail to the parts:—
1 designates the baling case and 2 the bed plate which connects the case 1 with a power mechanism that is located at the forward end of the machine and comprises the usual sweep shaft 3 and trip lever 4.

5 designates a pitman, having a cam head 6 at its forward end, that is adapted for engagement by the roller 7 on the trip lever 4, and is provided, at its opposite end, with a plunger 8 which is adapted for travel in the baling case. The baling case is closed except at its ends, in order that the hay may be pressed closely by the plunger, and is provided with an opening 9 in its top, through which hay may be fed to the plunger chamber.

Fixed to the back face of the plunger and extending rearwardly therefrom, is an apron 10 that is adapted for closing the opening 9 to prevent hay from passing into the plunger chamber while the plunger is traveling in the baling case. Apron 10 is preferably hinged in the middle and provided with a chain 11 by which it is folded, when the plunger moves backwardly, in order to shorten the apron on its forward stroke.

Supported on the baling case 1, over the opening 9, is a feed case 12, which is provided with a side opening through which loose hay may be fed. Hinged to case 12, at the lower end of the feed opening, is a hopper side 13, which is normally held inclined upwardly and outwardly from the feed case, but is adapted to fit snugly within the opening in order to close the case so that loose hay may be forced downwardly into the baling case, as will presently be described.

Supported on the case 12, at each side of the feed opening, are the hopper plates 14, between which the hopper side 13 is adapted to travel.

Revolubly mounted in brackets 15, which are preferably carried by the hopper plates 14, is a shaft 16. Fixed to the shaft 16 and to the under side of the hopper side 13 are toggle levers 17 which are adapted to raise and lower the hopper side upon the revolution of said shaft. Also fixed on shaft 16 is a sheave segment 18, to one end of which is a chain 19 is attached, such chain being led through the sheave groove and connected with the free end of a lever 20 which is fulcrumed on the baling case at 21.

22 designates guides which are fixed on and project from the lever 20, and 23 a roller which is revolubly mounted between said guides.

Revolubly mounted in bearings on the feed case 12, and extending across the inner end of the baling case, is a shaft 24. Fixed to the end of the shaft 24 that is adjacent to the hopper side, is a cam 25, that is adapted for engagement with the roller 23. Cam 25 is provided with a socket 26 within which the roller 23 is adapted to seat when the hopper side is open, with a swell 27 which is adapted to fit within a socket 28 in the lever 20 when the hopper side is in the same position, and with a leg 29 which is adapted for travel over the edge of said lever for the purpose of rocking same and closing the hopper side through the connection of the lever with the shaft 16, and the action of the toggle levers 17.

In order to provide against damage to the lever 20, should a fork, or the like, become caught in the feed case, I have provided the lever 20 with a spring trip which is adapted to yield, should a breaking pressure be brought to bear on the lever; the trip preferably comprising the bar 20′ which is pivoted at 30 to the body of the lever 20 and may be considered as part thereof.

Fixed to the bar 20′ is a bracket 31, having a socket 32 within which the ball 33 of a lever bar 34 is adapted to seat. Connected with bar 34 and extending through an aperture in the bracket 31 is a rod 35. Surrounding the rod 35 and bearing against the bracket 31 and a keeper 36, on the rod, is a compression spring 37, which is adapted for yieldingly retaining the lever bar in the position shown in Fig. IV. Connecting the outer end of the lever bar 34 with the end of the lever body 20 is a link 34ᵃ.

It is readily apparent that with a device of this character the lever body 20 and bar 20′ will act as a single piece, until a strain is put thereon which will overcome the tension of the spring 37, when the lever body and bar will buckle at the point 30 and compress the spring 37.

Inasmuch as the tripping device, just mentioned, is fully described in a separate application for Letters Patent, I will not refer to same more fully.

At the end of shaft 24, opposite that on which the cam 25 is mounted, is fixed a socket member 38, to which a lever 39 is attached, such lever being turned rearwardly from the socket member and provided with a guide arm 40 which extends toward the power end of the press. Pivoted to the lever 39, near its outer end, are the links 41, and connected with said links and extending between the ears 42, on the free end of the guide arm 40, is a chain 43, which is connected with the power mechanism, preferably through a rod 43′.

39′ designates a spring which is attached to the lever 39 at one end and to the feed case at its opposite end, and is adapted for returning the lever and feeding parts to initial position after each actuation by the chain 43 and rod 43′.

Referring now to the mechanism whereby the hay is forced downwardly through the feed case, 44 designates a plunger which is adapted to fit snugly within the feed case and travel vertically therein. Extending upwardly above the top of the feed case are the standards 45, having the cross bars 46. Supported on the bars 46 are the shaft bearings 47. Revolubly mounted in the bearings 47 and extending across the feed case are the shafts 48, upon which are rigidly fixed the lever brackets 49. Secured to each of brackets 49 is a toggle 50, the lower end of which is pivotally connected with the plunger 44 near the side of the feed case, adjacent to which the shaft 48, upon which the bracket carrying that particular toggle, is located. One of the brackets 49 on each shaft 48 is provided with an outwardly extending arm 51 upon which is mounted one end of a coil spring 52, the opposite end of which is suitably connected with the feed case, so that under normal conditions the arms 51 will be yieldingly held downwardly and the toggles 50 closed, under which conditions the plunger 44 will be retained in the upper portion of the feed case. Also rigidly secured to the shafts 48 are the brackets 53, having the inwardly directed arms 54 to which are pivoted the actuating levers 55, the lower ends of which are both pivoted to one end of a bell crank lever 56. Loosely mounted on shaft 24 is a fulcrum member 57. Fixed on member 57 is a substantially U-shaped member 58, to one end of which the bell crank lever 56 is pivoted.

In order to obviate undue strain on the parts actuating the feed plunger, I have provided a spring trip therefor, similar to the like part on the feed table, such trip comprising a bracket 31' which is rigidly mounted on the U-member 58 and has a socket 32' and an aperture therein. Seated in the aperture, in said bracket, is one end of a lever bar 34'. Connected with bar 34' is a rod 35'. Surrounding the rod 35' and bearing against the bracket 31' and against the keeper 36' is a compression spring 37', which is adapted for yieldingly retaining the lever bar in the position shown in Fig. II. Connecting the outer end of the lever bar 34', with the adjacent end of the bell crank lever 56, is a link 34ᵃ', such parts forming a spring trip which is adapted to yield when a breaking pressure is brought to bear on the U-member 58 or parts connected with the bell crank. The end of the U-member, opposite that on which the spring trip is mounted, is provided with a flange 58' that projects into the path of the lever 39, so that when the lever is moved backwardly it will engage the flange and rock the shaft 24 and actuate the levers 55 in a manner presently more specifically described.

Referring now to the power mechanism, 60 designates a bar that is fixed rigidly at the power end of the press and on the respective ends of which are pivotally mounted the links 61 and 61'. Pivotally connecting the free ends of the links 61 and 61', is a bar 62 which is adapted to move parallel with the bar 60, when the links are moved inwardly and outwardly, relative to the power head. The inner link 61 is provided with a roller socket 63 in which the trip lever roller 7 seats, as it is about to leave its contact with the pitman.

64 designates an arm which is pivotally mounted on the outer end of the stationary bar 60 and is adapted for travel therebeneath. On the inner end of arm 64 is revolubly mounted a horizontal sheave 65.

66 designates a chain, one end of which is permanently fixed to the bed plate 2 and the opposite end connected with the rod 43', the chain being led through the groove in sheave 65, so that when the arm 64 is moved outwardly, the rod will be drawn outwardly to actuate the feeding parts, heretofore described.

In Fig. XVII, I illustrate the preferred form of mounting for the arm 64. In order to obviate interference between the bar 60 and arm, I provide the former with a depending hub 67 and the link 61' with a shank 68 which extends through and is adapted for revolution within said hub. The head of arm 64 abuts against the lower end of the hub and shank and is held thereto by a bolt 69. The head of arm 64 is provided with a square socket and the lower end of the shank 68 with a square tip, that is adapted to fit within said socket, so that when the link 61' is moved forwardly or back, the arm 64 follows in the same direction.

70 designates a brace which extends from the outer end of the stationary bar 60 to a stationary portion of the power frame and sustains a portion of the strain that would otherwise be borne by said bar.

71 designates a spring which is connected with the pitman and with a stationary portion of the power head and is tensioned during the forward stroke of the pitman and draws same back when the lever roller leaves its contact with the pitman head. It occasionally happens, especially when the hay is not thoroughly dry, that the baling plunger sticks in the baling case and will not return under the spring tension. To insure the return of the pitman, after each forward stroke, I have provided a supplemental returning mechanism which is positive in its action and comprises the following parts. Pivotally mounted on the outer end of the stationary bar 60 is a lever 72 which is bell cranked at 73 and provided, at the end opposite its mounting, with a link 74.

75 designates a chain which is connected with the outer end of the link 74 and with the pitman 5, and 76 designates a bar which is connected with the lever 72 between its mounting and the crank angle, and with the link 74.

77 designates a bar which is connected with the free end of the link 61' and with the bar 72 near the bell crank angle.

The parts just described are so arranged and combined that when the links 61—61' and bar 62 are rocked outwardly by the trip lever 4, the bar and link mechanism, just described, will rotate and pull outwardly on the pitman 5, so that the latter is started on its backward movement to insure an extraction of the plunger so that the spring will return same to its initial position.

78 designates a spring which is connected with the pitman and with a laterally projecting bracket 79, on the power head, and is adapted for yieldingly holding the pitman head in position for engagement by the trip lever roller.

When the press is idle, but ready for use, the parts will be in the position shown in Fig. I, the spring 39' holding the power mechanism extended and the hopper side 13 in the open position, the springs 52 serving to counterbalance the feeding plunger and retain same in set position. When the press is in use, the shaft 3 is revolved in the usual manner and the head of the pitman engaged by the roller 7 on the trip lever 4, so that the pitman is moved back and the plunger 8 forced through the baling case and beneath the feed opening 9. When the plunger has completed its stroke in the baling case, the roller 7 will have left its contact with the head 6, and the spring 71, which has been tensioned during the forward stroke of the pitman, will return the latter to its initial position and draw the plunger 8 back to the forward end of the baling case. While, or about the time the plunger 8 is at its forward position, a charge of hay is fed through the side opening in the feed case into the case chamber, beneath the plunger 44. As the roller 7 leaves its contact with the pitman head it engages the roller seat 63 in the power link 61 and starts the rocking movement of the feeding power, the links 61—61' being moved outwardly as the trip continues its revolution and the arm 64, which is rigidly connected with the links, is revolved beneath the stationary bar 60. As the arm 64 is moved outwardly, the chain 66 and rod 43' are drawn outwardly, so that the lever 39 is rocked toward the front of the press, tensioning the spring 39' and turning the shaft 24 on which said lever is rigidly mounted. The cam 25 being rigidly mounted on the shaft 24 turns therewith and moves the leg 29 downwardly against the edge of the lever 20, so that said lever is rocked on its pivot and the chain 19 drawn downwardly, revolving the sheave segment 18 and turning the shaft 16 in its bearings. When the shaft 16 is turned, the toggles 17 are straightened and the hopper side 13 swung inwardly to close the opening in the feed case, so that the feeding chamber is inclosed at all sides. As the rod 43' continues to draw the lever 39 forwardly, the latter engages the flange 58' and rocks the lower arm of the lever 58 forwardly and the upper arm downwardly. When the lever 58 is actuated, as described, the links 55 are drawn downwardly and revolve the shafts 48 on the top of the feed case. When the shafts 48 are revolved, the brackets 49 are turned downwardly at their inner ends. The toggles 50, being rigidly connected with the brackets 49 and being pivotally connected with the plunger 44, are unfolded upon the actuation of the shafts 48 and tend to push the plunger downwardly against the charge of hay which has previously been inserted into the feed case, the leverage between the parts 58 and the feeding plunger being such that when the lever 39 has reached the position indicated in Fig. III, the plunger 44 will be at the bottom of the feed case, as shown in dotted lines Fig. V, when the charge of hay will have been forced into the baling case ready for engagement and compression by the plunger 8.

When the feeding mechanism has been actuated to the extent described, the roller 7 on the trip lever will leave its contact with the link 61 and the opposite arm of the lever will engage the pitman head for a succeeding actuation of the plunger 8. Immediately upon the release of the link 61, by the trip lever, the spring 39' will return the shaft 24 to its original position, drawing the rod 43' backwardly and unfolding the power mechanism and lowering the hopper side to expose the opening in the feed case. As soon as the lever 39 has left its contact with the flange 581, the springs 52 act on the plunger toggles 50 and raise the plunger 44 to the top of the feed case, the springs 52 being of such strength that they slightly over-balance the weight of the plunger, so that the toggles will close without unduly jarring the plunger and upper portion of the case. It is readily apparent that when the power mechanism, consisting of the folding links and bars that actuate the rod 43', is rocked, the chain 75 will pull outwardly on the pitman 5, so that if the plunger 8 should stick in the baling case, it will be positively loosened to enable it to yield to the tension of the spring 71.

Having thus described my invention, what I claim as new therein and desire to secure by Letter-Patent is:—

1. In a baling press, a feed case, having an opening for receiving material, a hopper side adapted to swing from a horizontal to a vertical position and for closing said opening when in its vertical position, a counterbalanced plunger adapted for travel in said case, and mechanisms for actuating said hopper side and plunger.

2. In a baling press, a baling case, a plunger adapted for travel in the baling case, a feed case having a side opening, a hopper side adapted to swing vertically on a horizontal axis to close said opening, a shaft extending parallel with the horizontal axis, toggles connecting the shaft and hopper side, means adapted for revolving the shaft in one direction, and a plunger adapted for vertical reciprocation in the feed case.

3. In a baling press, a baling case, a plunger adapted for travel in said case, a feed case having a side opening, a plunger adapted for travel in the feed case, a hopper side hinged to the feed case near the lower edge of said opening and adapted to swing vertically, a shaft adapted to revolve in a plane parallel with the hopper side axis, toggles rigidly mounted on the shaft and connected with the hopper side, a lever flexibly connected with the shaft, means for actuating said lever, and yielding means for returning the hopper side to table position.

4. In a baling press, a feed case having an opening adapted for receiving material, a hopper side hinged adjacent to said opening, and adapted for closing same, a revoluble shaft, toggles connecting the shaft and hopper side, a sheave segment rigidly mounted on said shaft, a chain fixed to said segment and led through said groove, a lever connected with said chain, means for actuating said lever, and plungers adapted for reciprocation, one in the baling case and one in the feed case.

5. In a baling press, a feed case having an opening adapted for receiving material, a hopper side hinged adjacent to said opening and adapted for closing same, a revoluble shaft, toggle links connected with said shaft and hopper side, a sheave segment rigidly mounted on said shaft, a chain fixed to said segment and led through the sheave groove, a lever connected with said chain, means for actuating said lever, and means for returning the hopper side to its first position upon the release of said lever from its actuating means.

6. In a baling press, a feed case having a side opening, a hopper side hinged to said case, near the lower edge of said opening, a shaft revolubly mounted adjacent to said hopper side, toggle links connecting said shaft and said hopper side, a sheave segment fixed on said shaft, a lever flexibly connected with said segment, a cam adapted for actuating said lever, means for actuating said cam, a spring adapted for returning the hopper side and lever to initial position when released by said cam, and a plunger adapted for travel in said case.

7. In a baling press, a feed case having an opening for receiving material, a hopper side adapted for closing said case, a lever, means connecting the lever with the hopper side, a cam adapted for constant engagement with said lever and for positively actuating same in one direction, means for actuating said cam, and a plunger adapted for travel in said case.

8. In a baling press, a feed case having an opening for receiving material, a hopper side adapted for closing said opening, means for yieldingly holding said hopper side in its open position, a lever operatively connected with said hopper side and provided with an anchoring socket, a cam having an anchoring portion adapted to seat within the lever socket and provided with a leg that is adapted for actuating engagement with said lever, means for positively operating the cam in one direction, a spring adapted for returning said hopper side and lever when released from said cam, and a plunger adapted for travel in said case.

9. In a baling press, a feed case having an opening adapted for receiving material, a hopper side adapted for closing said opening, a lever operatively connected with said hopper side, a shaft revolubly mounted adjacent to said lever, a cam fixed on said shaft, means for yieldingly retaining said lever in engagement with said cam, means for yieldingly retaining said shaft in a set position, means for positively actuating said shaft against the tension of said retaining means, and a plunger adapted for travel in said case.

10. In a baling press, a feed case having an opening adapted for receiving material, a hopper side adapted for closing said opening, means for yieldingly retaining said hopper side in its open position, a lever adapted for actuating said hopper side against the tension of its holding means, guide plates carried by said lever, a roller revolubly mounted between said guide plates, a revoluble shaft, a cam fixed on said shaft and adapted for engagement with said lever and said roller, means for yieldingly retaining said shaft in a set position, means for positively actuating the shaft against the tension of said retaining means, and a plunger adapted for travel in said case.

11. In a baling press, a baling case, a plunger, a feed case having communication with the baling case, a plunger adapted for travel in the feed case, toggles connected with said plunger, means for actuating the toggles in one direction and means for automatically retracting said toggles.

12. In a baling press, a baling case, a plunger, a feed case having communication with the baling case, a plunger adapted for travel in the feed case, toggles connected with said plunger, means for actuating the toggles to lower the feeding plunger, and springs adapted for actuating the toggles to lift the feeding plunger.

13. In a baling press, a baling chamber, a feed-chamber above and communicating with the baling chamber, a feed-plunger vertically reciprocable in the feed-chamber, toggles connected with said plunger, and means for actuating the toggles.

14. In a baling press, a baling case, a feed case arranged perpendicularly to the baling case, a plunger adapted for reciprocation in the baling case, a plunger adapted for reciprocation in the feed case, toggles connected with the feed case and with the feeding plunger, and means for actuating said toggles.

15. In a baling press, a horizontal baling case, a plunger adapted for travel in said baling case, a vertical feed case, a plunger adapted for travel in said feed case, shafts revolubly mounted on the upper end of the feed case, toggles connected with the shafts and feeding plunger, and means for revolving said shafts.

16. In a baling press, a horizontal baling case, a plunger adapted for travel in said case, a perpendicular feed case having communication with the baling case, a plunger adapted for reciprocation in the feed case, toggles mounted on the feed case and connected with the feeding plunger, means for actuating the toggles to lower the feeding plunger, and springs adapted for lifting the feeding plunger.

17. In a baling press, a feed case, a plunger adapted for vertical travel in said case, levers mounted on the feed case and connected with the plunger, means for actuating said levers to lower the plunger, and normally inert springs connected with said levers and adapted for lifting the plunger after its downward travel.

18. In a baling press, a feed case, a plunger adapted for vertical travel in said case, levers mounted on the feed case and each connected at one end with the plunger, springs connected with the opposite ends of said levers, and means for actuating the levers against the tension of said springs to lower the plunger, said actuating means being adapted to release the levers after the plunger has reached the downward limit of its travel.

19. In a baling press, a feed case, a plunger adapted for vertical travel in the feed case, an intermediate member having operative connection with the plunger, an arm adapted for abutment against the intermediate member, to produce downward travel of the plunger, means for positively actuating said arm, a spring adapted for returning said arm after each positive actuation, and yielding means for raising the plunger after the completion of its downward travel.

20. In a baling press, a feed case, a plunger adapted for travel in said case, toggles, each having a mounting on the feed case, and a connection with said plunger, springs connected with said toggles and adapted for retaining said plunger in a set position, and means for simultaneously actuating said toggles against the tension of said springs.

21. In a baling press, a feed case having an opening adapted for receiving material, a plunger, a baling case having communication with said feed case, a plunger adapted for forcing material from said feed case to the baling case, shafts revolubly mounted on said feed case, toggles, each having a link fixed to one of said shafts and a link pivoted to said plunger, springs adapted for holding said toggles in folded position, and means for positively actuating said shafts in one direction for the purpose set forth.

22. In a baling press, a feed case having an opening for receiving material, a plunger adapted for travel in said case, shafts revolubly mounted near opposite sides of said case, toggles fixed on each of said shafts and pivotally connected with said plunger, near the edge adjacent to their fixed mountings, means for yieldingly retaining said toggles in their folded position, and means for positively actuating said shafts against the tension of said yielding means.

23. In a baling press, a feed case having an opening for receiving material, a plunger adapted for travel in said case, shafts revolubly mounted on said case, levers carried by said shafts and connected with said plunger, arms fixed on said shafts, levers connected with said arms, means for actuating the arm levers to revolve said shafts, and springs connected with said shafts and adapted for returning same to their first position, when released from the actuation of said arm levers.

24. In a baling press, a feed case, a plunger adapted for travel in said case, a revoluble shaft, a fulcrum member loosely mounted on said shaft and operatively connected with said plunger, means for yieldingly retaining said plunger and fulcrum member in a set position, an arm fixed on said shaft, a member on said fulcrum member adapted for engagement by said arm, means for actuating said arm in one direction, and means for returning the arm in the opposite direction, for the purpose set forth.

25. In a baling press, a feed case, a plunger adapted for travel in said case, a revoluble shaft, a fulcrum member loosely mounted on said shaft, a member fixed to said fulcrum member and operatively connected with said plunger, a laterally projecting flange on said member, an arm fixed on said shaft and adapted for engagement with said flange, a spring adapted for yieldingly retaining said arm in a set position, means for actuating said arm against the tension of said spring, and yielding means for returning said plunger to a set position.

26. In a baling press, a feed case having an opening adapted for receiving material, a hopper side adapted for closing said opening, a plunger adapted for travel in said case, yielding means for retaining said hopper side in its open position, yielding means for retaining said plunger in a set position, a revoluble shaft operatively connected with said hopper side, a fulcrum member loosely mounted on said shaft, a member fixed to said fulcrum member and operatively connected with said plunger, an arm fixed on said shaft and adapted for engagement with said fixed member, means for yieldingly retaining said arm in a set position, and means for positively actuating said arm against the tension of said yielding means.

27. In a baling press, a baling case, a plunger adapted for reciprocation in said case, a feed case communicating with said baling case and provided with an opening for receiving material, a hopper side adapted for closing said opening, means for yieldingly retaining said hopper side in an open position, a plunger adapted for travel in said feed case toward and from the baling case, means for yieldingly retaining said plunger in a set position, a revoluble shaft having operative connection with said hopper side, a fulcrum member loosely mounted on said shaft and having a member fixed thereon and operatively connected with said plunger, an arm fixed on said shaft and adapted for engagement with said fixed member after the shaft has completed a partial revolution, a spring for yieldingly retaining said arm in a set position, means for actuating said parts to first reciprocate the baling plunger, then move the hopper side to close the feed case opening and then actuate the feeding plunger, and yielding means for returning all of said parts to their initial position.

28. In a baling press, a feed case, a plunger adapted for travel in said case, an arm operatively connected with said plunger, an arm pivotally mounted near the power end of the press and provided with a rope bearing, means for actuating said pivotally mounted arm, a chain fixed to a permanent portion of said press and connected with said plunger arm and led over the bearing on said pivoted arm, and means for actuating said pivoted arm for the purpose set forth.

29. In a baling press, a feed case, a plunger adapted for travel in said case, an arm pivotally mounted near the sweep end of said press, a trip lever adapted for actuating said arm, a sheave revolubly mounted on said arm, and a chain fixed at one end on said press, and run over said sheave and operatively connected with said plunger, for the purpose set forth.

30. In a baling press, the combination with a pitman having a baling plunger and cam head at its opposite ends, a feeding plunger, an arm pivotally mounted near the cam end of said pitman, a trip lever adapted for successively operating said pitman and arm, a sheave revolubly mounted on said arm, and a chain fixed at one end to said press and run over said sheave and operatively connected with the feeding plunger, substantially as and for the purpose set forth.

31. In a baling press, a baling case, a plunger adapted for reciprocation in said case, a pitman connected with said plunger, a feed case, a plunger adapted for reciprocation in said feed case, a pivoted arm, mechanism adapted for actuation by said arm and for actuating said feeding plunger, a power head adapted for engagement with the pitman, a lever mechanism adapted for actuation by the power head, flexible connection between the power head and pivoted arm, and springs adapted for returning the pitman and arm to initial position after each actuation by the power head.

32. In a baling press, the combination with a baling case and feed case, of separate plungers adapted for travel in said cases, a pitman connected with the baling plunger, lever mechanism connected with the feeding plunger, a pull chain having one end permanently fixed and the other end connected with said lever mechanism, a pivoted arm adapted for actuating said pull chain, and a trip lever adapted for successively actuating said baling plunger and arm.

33. In a baling press the combination with a baling case and feed case, of separate plungers adapted for travel in said cases, a pitman connected with the baling plunger, lever mechanism connected with the feeding plunger, a pull rod connected with the lever mechanism, a pivoted arm, a sheave carried by the arm, a chain permanently fixed at one end and connected with the pull rod at the opposite end and run over said sheave, and a trip lever adapted for actuating said baling plunger and pivoted arm.

34. In a baling press, a baling case, a plunger adapted for travel in the baling case, a pitman for actuating said plunger, a pivoted link, a lever pivoted concentrically with said link and connected with said plunger, a bar pivotally connecting the link and lever, connection between the lever and pitman, and a trip lever adapted for successively actuating the pitman and link.

35. In a baling press, a baling case, a plunger adapted for travel in said case, a pitman connected with said plunger, a spring adapted for yieldingly retaining the pitman in set position and returning same after each forward movement, mechanism adapted for positively starting the plunger on its returning travel, and a trip member adapted for successively actuating the pitman and starting mechanism.

36. In a baling press, a baling case, a plunger adapted for travel in said case, a pitman connected with said plunger, a spring adapted for yieldingly retaining the pitman in and returning same to set position, a fixed bar, a pair of links pivotally mounted on the bar and pivotally connected with each other, a lever pivoted concentrically with one link and flexibly connected with said pitman, a bar pivotally connecting said link and lever, and a trip lever adapted for successive engagement with the pitman and with the other link of said pair, for the purpose set forth.

In testimony whereof I affix my signature in presence of two witnesses.

ROBERT C. CAUGHEY.

Witnesses:
MYRTLE M. JACKSON,
E. A. CAHILL.